(12) United States Patent
Kanaya et al.

(10) Patent No.: US 8,067,082 B2
(45) Date of Patent: Nov. 29, 2011

(54) WHITE FILM AND BACKLIGHT USING SAME

(75) Inventors: Tomoko Kanaya, Otsu (JP); Tadami Matsuyama, Ibaraki (JP); Yoshihiko Sakaguchi, Otsu (JP); Osamu Watanabe, Kusatsu (JP)

(73) Assignee: Toray Industries, Inc. (JP)

( * ) Notice: Subject to any disclaimer, the term of this patent is extended or adjusted under 35 U.S.C. 154(b) by 394 days.

(21) Appl. No.: 11/665,078

(22) PCT Filed: Nov. 9, 2005

(86) PCT No.: PCT/JP2005/020510
§ 371 (c)(1),
(2), (4) Date: Apr. 11, 2007

(87) PCT Pub. No.: WO2006/051804
PCT Pub. Date: May 18, 2006

(65) Prior Publication Data
US 2009/0027590 A1   Jan. 29, 2009

(30) Foreign Application Priority Data
Nov. 12, 2004   (JP) .................................. 2004-328719

(51) Int. Cl.
*B32B 3/00*   (2006.01)
*B32B 3/26*   (2006.01)
*B32B 27/06*   (2006.01)
*B32B 27/18*   (2006.01)
*B32B 27/36*   (2006.01)

(52) U.S. Cl. ...................... 428/195.1; 428/1.1; 428/1.33; 428/304.4; 428/314.4; 428/315.5; 428/318.4; 428/319.3; 428/319.7; 428/480; 359/350; 359/361

(58) Field of Classification Search ........................ None
See application file for complete search history.

(56) References Cited

U.S. PATENT DOCUMENTS

| | | | | |
|---|---|---|---|---|
| 5,422,175 | A * | 6/1995 | Ito et al. ...................... | 428/304.4 |
| 5,800,909 | A * | 9/1998 | Nitta et al. ...................... | 428/207 |
| 5,803,579 | A * | 9/1998 | Turnbull et al. .............. | 362/516 |
| 5,843,578 | A * | 12/1998 | Sasaki et al. .................. | 428/483 |
| 5,958,552 | A * | 9/1999 | Fukuda et al. ................ | 428/141 |
| 6,394,946 | B1 * | 5/2002 | Giovannini et al. ............ | 600/15 |
| 6,773,787 | B2 * | 8/2004 | Maas et al. ...................... | 428/141 |
| 6,867,416 | B2 * | 3/2005 | Nakamura ..................... | 250/318 |
| 6,896,941 | B1 * | 5/2005 | Yoshida et al. ............ | 428/32.18 |
| 7,041,344 | B2 * | 5/2006 | Kusume et al. ................ | 428/1.1 |
| 7,238,419 | B2 * | 7/2007 | Kern et al. ..................... | 428/328 |
| 7,261,934 | B2 * | 8/2007 | Kusume et al. ............... | 428/212 |

(Continued)

FOREIGN PATENT DOCUMENTS

JP   05-339408   * 12/1993
JP   8-262208 A   10/1996

(Continued)

*Primary Examiner* — Vivian Chen
(74) *Attorney, Agent, or Firm* — DLA Piper LLP (US)

(57) ABSTRACT

A white film including polymer film wherein both the thermal shrinkage rate in the longitudinal direction and that in the transverse direction of the film are not less than −0.2% and not more than 0.5% at 90° C., and a backlight for liquid crystal displays using such a white film. Since the white film hardly suffers from undulation or rise in its end portions, it is most suitable as a reflection film for backlights of liquid crystal displays. Since a backlight for liquid crystal displays using this white film can be used for a long time, it is applicable to liquid crystal displays of various electrical/electronic devices.

12 Claims, 2 Drawing Sheets

U.S. PATENT DOCUMENTS

| | | | |
|---|---|---|---|
| 7,413,799 B2 * | 8/2008 | Hiruma et al. | 428/328 |
| 2001/0036545 A1 * | 11/2001 | Nishi et al. | 428/315.7 |
| 2001/0036546 A1 * | 11/2001 | Kaytor et al. | 428/316.6 |
| 2002/0146218 A1 * | 10/2002 | Stricot et al. | 385/88 |
| 2003/0043324 A1 | 3/2003 | Tanaka et al. | |
| 2004/0213981 A1 * | 10/2004 | Clark et al. | 428/304.4 |

FOREIGN PATENT DOCUMENTS

| | | | |
|---|---|---|---|
| JP | 09-277479 | * | 10/1997 |
| JP | 09-278916 | * | 10/1997 |
| JP | 2001-166295 | * | 6/2001 |
| JP | 2001-166295 A | | 6/2001 |
| JP | 2002-09515 | * | 3/2002 |
| JP | 2002-90515 A | | 3/2002 |
| JP | 2002-182211 | * | 6/2002 |
| JP | 2002-333511 A | | 11/2002 |
| WO | WO 01/96451 A1 | | 12/2001 |
| WO | WO 02/04996 A1 | | 1/2002 |

* cited by examiner

WHITE FILM AND BACKLIGHT USING SAME

RELATED APPLICATION

This is a §371 of International Application No. PCT/JP2005/020510, with an international filing date of Nov. 9, 2005 (WO 2006/051804 A1, published May 18, 2006), which is based on Japanese Patent Application No. 2004-328719, filed Nov. 12, 2004.

TECHNICAL FIELD

The technology herein relates to while films that reflect light from a source such as a cold-cathode tube in a backlight device designed for display devices including crystal liquid displays, and also to backlight devices comprising such white films.

BACKGROUND

Liquid crystal displays use backlights to illuminate liquid crystal cells. Edge-type backlight devices are used in liquid crystal display monitors, while direct-type backlight devices are used in liquid crystal display televisions. Porous while film containing air bubbles are generally used as such reflection film for backlight as disclosed in Unexamined Patent Publication (Kokai) No. 8-262208. It has also been proposed to provide the white film with an ultraviolet-absorbing layer to prevent the film from being yellowed by the ultraviolet ray coming from cold-cathode tubes (Unexamined Patent Publication (Kokai) No. 2001-166295 and Unexamined Patent Publication (Kokai) No. 2002-90515). In most cases, such porous white film is stamped out or formed after being laminated with an aluminum plate or a SUS plate to maintain its shape during use (Unexamined Patent Publication (Kokai) No. 2002-333511).

Recently, large-size liquid crystal display devices such as liquid crystal display televisions have been developed, leading to increased demand for direct-type backlight devices. Conventionally, porous white film is laminated with a rear plate (rear chassis), which may be an aluminum plate or a SUS plate, by heat sealing or with an adhesive as shown in FIG. 4. However, recently, new types of backlight reflecting plates, which comprise white film adhered to a rear plate with an adhesive tape as shown in FIG. 3 or which comprises reflection film partially fixed to the rear plate with hooks, have been developed to facilitate the assembling processes and reduce the prices of backlight devices. It has been found, however, that these methods cannot achieve strong adhesion as compared to heat sealing or an adhesive, leading to some problems such as distortion of the white film and lifting of the end portions can be a serious problem in larger-size liquid crystal display devices that have been developed in recent years.

It could therefore be advantageous to provide white films that can serve as a reflecting plate in a backlight device without suffering distortion or lift of the end portions even if the reflecting plate is adhered in a simple manner in the backlight device which may be contained in a television and used for a long period of time. The faces of such film may be easily mistaken for each other during the assembling process and, therefore, it could also be helpful to provide white films that can serve as a reflecting plate in a backlight device while avoiding the occurrence of such a mistake.

SUMMARY

We provide films that can serve as a reflecting plate in a backlight device without suffering the above-mentioned problems such as distortion or lift of the end portions, the film preferably being white film that has two easily identified faces so that they are not easily mistaken for each other during the assembling process.

The white films may include:
(1) White film comprising polymer film wherein both the thermal shrinkage rate in the longitudinal direction and that in the transverse direction of the film are not less than −0.2% and not more than 0.5% at 90° C.
(2) White film as described in Item (1) above wherein the polymer film contains air bubbles.
(3) White film as described in Item (2) above wherein the polymer film is biaxially oriented polyethylene terephthalate film.
(4) White film as described in any of Items (1) to (3) above wherein at least one face of the polymer film is provided with an ultraviolet-absorbing layer that contains an ultra-violet-absorbing substance.
(5) White film as described in Item (4) above wherein the other face, which is not the face provided with the ultra-violet-absorbing polymer film layer, is provided with a printed lay that contains ink.
(6) White film as described in Item (5) above wherein the printed layer is provided in parts of polymer film.
A backlight device for liquid crystal display may include:
(7) A backlight device for liquid crystal display comprising white film as described in any of Items (1) to (6) above.
(8) A backlight device for liquid crystal display as described in Item (7) wherein the backlight device is of the direct type.
(9) A backlight device for liquid crystal display as described in Item (8) wherein the size of the liquid crystal display is not less than about 76.2 cm (30 inch).

Figure 1:
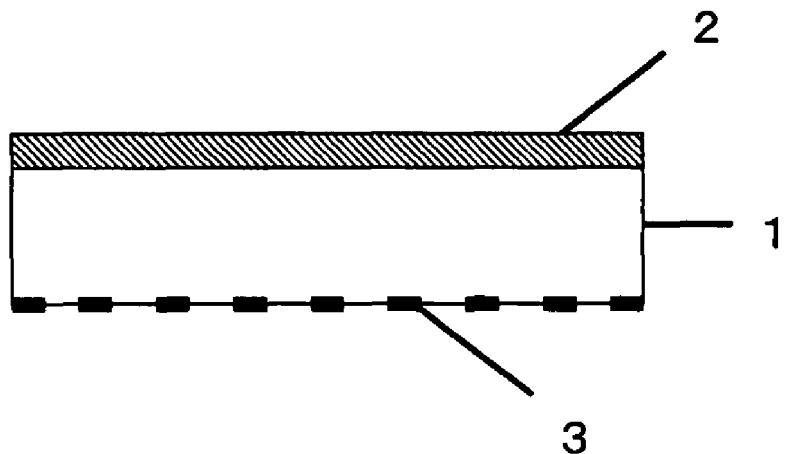
FIG. 1 shows a rough cross-sectional view of a white film.

EXPLANATION OF NUMERALS 1 film
2 ultraviolet-absorbing layer
3 printed layer
4 rear plate
5 adhesive
6 double-sided adhesive tape

DETAILED DESCRIPTION

Our white films comprise polymer film wherein both the thermal shrinkage rate in the longitudinal direction and that in the transverse direction of the film are not less than −0.2% and not more than 0.5% at 90° C.

Film as mentioned above is material that has a thin layer-like form and is generally referred to as film and may be material with a thickness of more than about 500 micrometers that is generally referred to as sheet.

Polymer as mentioned above is an organic polymer and, though there are no specific limitations on its type, preferably is thermoplastic resin that can be melt-processed, such as polyesters including polyethylene terephthalate, polyethylene naphthalate, and polycyclohexylene-dimethylene terephthalate; polyolefines including polyethylene, polypropylene, and polycyclohexane dimethanol; polyamides; polyurethanes; and polyphenylene sulfides.

The polymer may be a copolymer and may contain different additives such as thermal stabilizers, antioxidants, lubricants, organic or inorganic particulates, light resistance improvers, antistatic agents, and nucleating agents, to the extent that they have no adverse effect on its properties as film. Of these organic polymers, polyesters are preferred because they have high mechanical stability and do not absorb visible light significantly. Polyethylene terephthalate is particularly preferred.

The thermal shrinkage rate in the film's longitudinal direction measured at 90° C. is determined by preparing a polymer film sample of an appropriate size, measuring the length ($L_0$) of a certain part in the longitudinal direction (the direction of extrusion performed in the production process) at room temperature, leaving the sample for 30 minutes in a constant temperature bath maintained at 90° C., gradually cooling the bath to room temperature, measuring the length (L) of the part that originally had the length of $L_0$, and calculating the rate from the length (L) and the initial length ($L_0$) using the following equation:

$$\text{Thermal shrinkage rate (\%)} = \{\{L_0-L\}/L_0\} \times 100 \quad (1).$$

If the rate has a negative value, it means that the polymer film has increased in length. The thermal shrinkage rate in the film's transverse direction measured at 90° C. is determined from measurements taken in the transverse direction (right angles to the direction of extrusion performed in the production process) by the same procedure as for the longitudinal direction of the film).

Both the thermal shrinkage rate in the longitudinal direction and that in the transverse direction of the polymer film at 90° C. are not less than −0.2% and not more than 0.5%, preferably in the range of −0.1 to 0.3%, more preferably in the range of −0.05 to 0.25%, most preferably in the range of −0.05 to 0.15%. If the thermal shrinkage rate in the longitudinal direction or that in the transverse direction of the film at 90° C. is out of the range of −0.2 to 0.5%, the film can suffer deformation during use as a reflect film in a backlight device.

Biaxially oriented film is preferred because such polymer film, if thin, has a large mechanical strength, and generally has a uniform thermal shrinkage rate in the longitudinal direction and also because the thermal shrinkage rate in the transverse direction can be maintained at a low value during the film production process. Among others, biaxially oriented film of polyethylene terephthalate is particularly preferred as the polymer film.

The term "white" of the white film means that the mean reflectance in the wavelength range of 400 nm to 700 nm is not less than about 85%. There are no specific limitations on the method used for increasing the reflectance for visible light, but the use of film containing air bubbles is preferred. There are no specific limitations on the white film, but preferred examples include unstretched or biaxially oriented porous polypropylene film, and unstretched or stretched porous polyethylene terephthalate film. Method for their production are described in detail in Kokai (Unexamined Patent Publication) No. 8-262208, paragraphs [0034] to [0057], Kokai No. 2002-90515, paragraphs [0007] to [0018], and Kokai No. 2002-138150, paragraphs [0008] to [0034]. Among others, biaxially oriented porous white polyethylene terephthalate film as disclosed in Kokai No. 2002-90515 is particularly preferred as the polymer film for the above-mentioned reasons.

The white film can suffer deterioration (for example, optical deterioration such as yellowing, and degradation that causes decrease in molecular weight) caused by light, ultraviolet ray in particular, from a light source such as a cold-cathode tube and, therefore, an ultraviolet absorber layer should preferably be provided on at least one face of the polymer film. There are no specific limitations on the ultraviolet absorber layer, but preferred substances include resins containing inorganic ultraviolet absorbers such as $TiO_2$ and ZnO, resins containing organic ultraviolet absorbers such as benzotriazole and benzophenone, resins copolymerized with benzotriazole- or benzophenone-based reactive monomers, the latter resins further copolymerized with hindered amine based reactive monomers, other similar organic ultraviolet-absorbing resins, and other resins containing both inorganic and organic ultraviolet absorbers. Among others, organic ultraviolet-absorbing resins such as those copolymerized with benzotriazole- or benzophenone-based reactive monomers, and these resins further copolymerized with hindered amine based reactive monomers are particularly preferred because they can have high ultraviolet-absorbing performance even in the form of a thin layer. Methods for their production are described in detail in Unexamined Patent Publication (Kokai) No. 2002-90515, paragraphs [0019] to [0039].

In the white film, both faces are white, and even after lamination with an ultraviolet-absorbing layer, it will be difficult to distinguish between the two faces. In the assembling process, therefore, the ultraviolet-absorbing layer may be set toward the rear plate (rear chassis) by mistake instead of toward the light source. To avoid such a mistake, the face that is free of an ultraviolet-absorbing layer should preferably have a printed layer so that it can be distinguished easily from the face that has an ultraviolet-absorbing layer. There are no specific limitations on the printed layer, and it is preferably coated (or printed) with resin (or ink) containing an ordinary dye or pigment. Such printed layer should preferably be provided in parts, instead of over the entire surface, of the film because the white film and the rear plate (rear chassis) can be adhered more strongly when they are combined with an pressure sensitive adhesive tape or the like.

Figure 2:
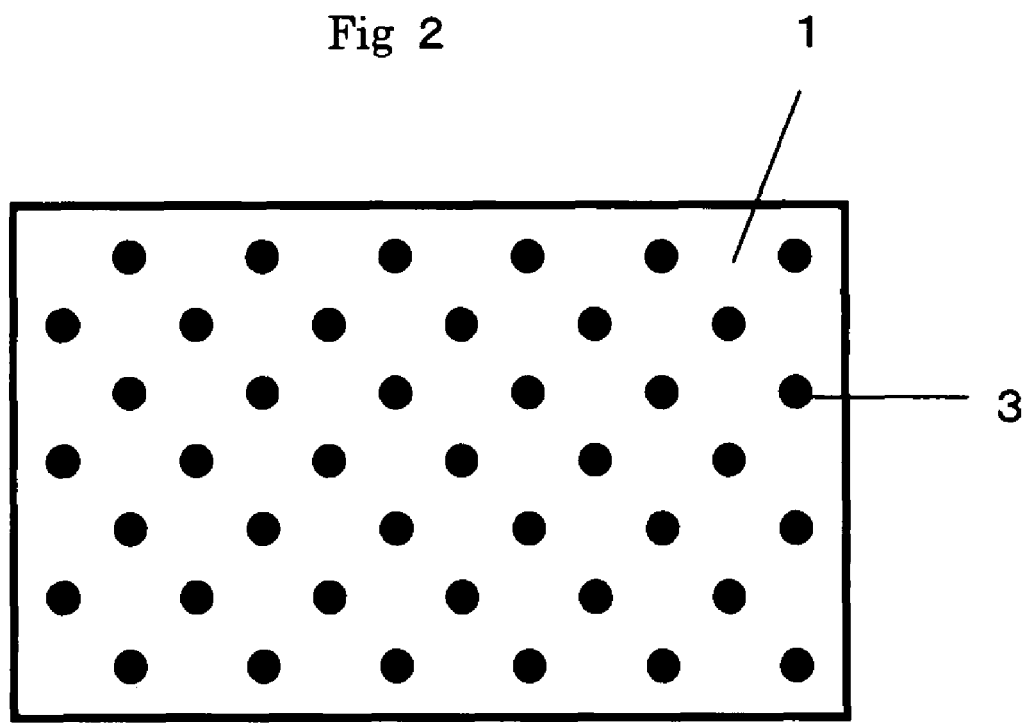
FIG. 2 shows a rough plan view of a white film showing a printed layer.
Figure 3:
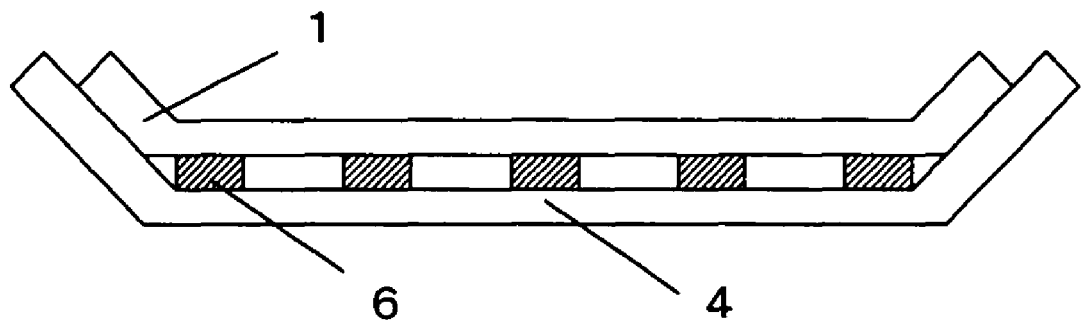
FIG. 3 shows a rough cross-sectional view of a backlight reflecting plate.
Figure 4:
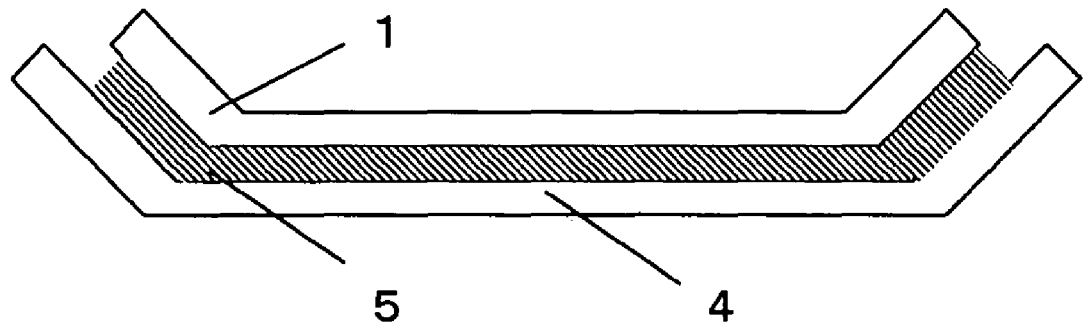
FIG. 4 shows a rough cross-sectional view of a backlight reflecting plate produced by a conventional production method.

A rough sectional view and a rough plan view (looking from above) of an example of the white film that has an ultraviolet-absorbing layer and a printed layer are shown in FIGS. 1 and 2, respectively. In FIG. 1, an ultraviolet-absorbing layer 2 is provided by coating on the top surface (facing toward the light source (not shown)) of a white film 1, and a printed layer 3 is provided by printing on the bottom surface (facing toward the rear plate (not shown)). In FIG. 2, printed layers 3 are provided in a pattern in parts of a face of the white film 1.

There are no specific limitations on the methods used to produce the polymer film that has a thermal shrinkage rate in the longitudinal direction and a thermal shrinkage rate in the transverse direction of the film in the range not less than −0.2% and not more than 0.5% at 90° C., but film having a thermal shrinkage rate in the longitudinal direction and a thermal shrinkage rate in the transverse direction in the desired range at 90° C. can be produced by performing heat treatment during the film forming process at an appropriately controlled heat treatment temperature, film's tension and traveling speed in the heat treatment zone.

Film having a thermal shrinkage rate in the longitudinal direction and a thermal shrinkage rate in the transverse direction in the desired range at 90° C. can also be produced by allowing polymer film to pass through a heated oven in the coating equipment while controlling mainly the temperature of the heated oven, film's tension and traveling speed to ensure desired heat treatment.

Furthermore, when coating is performed to provide a coated layer containing an ultraviolet-absorbing substance or when printing is performed to provide a printed layer for distinguishing between the faces, heat treatment can be achieved simultaneously with the coating or printing by controlling mainly the temperature, film's tension and traveling speed in the heated oven in the drying and curing processes in the heated oven to allow the film to have a thermal shrinkage rate in the longitudinal direction and a thermal shrinkage rate in the transverse direction in the desired range at 90° C.

If the white film is used, a good backlight device free of distortion of the film or peeling in the end portions, like conventional products produced by adhering film to an aluminum plate by fusion or with an adhesive, can be produced by combining the film with the rear plate (rear chassis) by using an adhesive tape or other methods with relatively poor adhesion force. In particular, although direct-type backlight devices generally have a large area, the white film can be easily adhered over a large area and, even if large in area, can be free of distortion and peeling, serving for production of high-quality backlight devices.

For the latest liquid crystal display products, the film size (diagonal length of rectangle) should preferably be not less than 76.2 cm (30 inches), preferably not less than 88.9 cm (35 inches), more preferably not less than 101.6 cm (40 inches), and most preferably not less than 127 cm (50 inches).

EXAMPLES

The following evaluation methods are used in the examples and comparative examples described below.

(1) Thermal Shrinkage Rate in the Longitudinal Direction of Film at 90° C.:

From polymer film, a rectangle with a length of 300 mm in the film's longitudinal direction (long side) and a width of 20 mm in the film's transverse direction (short side) was cut out to provide a test piece, in which two gauge marks 200 mm (=$L_0$) away from each other were made in the central portion at room temperature. The line connecting the two gauge marks were parallel with the long side. A clip was attached to one of the short sides of the test piece, which was then suspended in the vertical direction and immersed for 30 minutes in a constant temperature bath maintained at 90° C. Then, it was cooled gradually to room temperature, and the distance between the gauge marks (=L) was measured. From L and $L_0$, the thermal shrinkage rate in the film's longitudinal direction was calculated by the following equation:

Thermal shrinkage rate in the film's longitudinal direction=$\{(L_0-L)/L_0\}\times 100$.

(2) Thermal Shrinkage Rate in the Transverse Direction of Film at 90° C.:

The same procedure as for the measurement of the thermal shrinkage rate in the film's longitudinal direction was carried out except that the long side and the short side of the test piece were in the transverse direction and the longitudinal direction, respectively, of the polymer film.

(3) Shape of White Film:

Using a pressure sensitive adhesive double-coated tape, white film was attached to the rear chassis of a backlight unit for liquid crystal television with a display size of 60.96 cm (24 inches) or 132.08 cm (52 inches) to provide a reflection plate, followed by fixing the backlight unit in a liquid crystal television, turning on the television, keeping it operating for three consecutive months, removing the backlight unit from the liquid crystal television, and the white film in the reflection plate was observed visually. Results of the observation were evaluated according to the following criteria A, B and C, and the white film was judged as good if it met the criterion A:

A: free of deformation
B: suffering slight distortion
C: suffering significant distortion or peeling in end portions.

Example 1

A face of 188 micrometer thick, porous, biaxially oriented white film of polyethylene terephthalate (Lumiror E60L of Toray Industries Inc.) was coated with resin containing an organic ultraviolet-absorbing substance up to a thickness of 5 micrometers to provide ultraviolet resistant white film (Lumiror E60V of Toray Industries Inc.). The ultraviolet resistant white film was allowed to pass coating equipment so that it is heat treated under the following conditions: temperature of the heated oven of 160° C., tension on the film in the heated oven of 49N/m, and traveling speed of the film of 10 m/min. Then, using sky blue ink, dots with a diameter of 10 mm arranged 50 mm away from each other in both the longitudinal and the transverse direction were printed with a printer over the other face of the film which was free of said ultraviolet-absorbing layer.

Example 2

White film was produced under the same conditions as in Example 1 except that the tension on the film in the heated oven was 68.6N/m.

Example 3

White film was produced under the same conditions as in Example 1 except that the tension on the film in the heated oven was 98N/m.

Example 4

Using a coating machine, a face of 250 micrometer thick, porous, biaxially oriented white film of polyethylene terephthalate (Lumiror E6SL of Toray Industries Inc.) was coated with resin coating material containing an organic ultraviolet-absorbing substance so that its thickness will be 5 micrometers after drying. The film was dried by allowing it to pass through hot air ovens (first, second and third ovens were adjusted to 90° C., 150° C. and 120° C., respectively) under the following conditions: tensile tension on the film of 147N/m, and traveling speed of the film of 20 m/min. Then, it was wound up. Subsequently, using blue ink, dots with a diameter of 5 mm arranged 20 mm away from each other in both the longitudinal and the transverse direction were printed with a printer over the other face of the film which was free of the ultraviolet-absorbing layer to provide white film.

Example 5

Using a coating machine, a face of 250 micrometer thick, porous, biaxially oriented white film of polyethylene terephthalate (Lumiror E6SL of Toray Industries Inc.) was coated with resin coating material containing an organic ultraviolet-absorbing substance so that its thickness will be 5 micrometers after drying. The film was dried by allowing it to pass through a hot air oven (the temperature in the oven was adjusted to 90° C., followed by 150° C., and then 120° C.) under the following conditions: tensile tension on the film of 147N/m, and traveling speed of the film of 20 m/min. Then, it was wound up.

The film was allowed to travel through the oven again under the same oven conditions to perform heat treatment.

TABLE 1

| | Tension on film during heat treatment (N/m) | Thermal shrinkage rate in longitudinal direction at 90° C. of reflection film for backlight device (%) | Thermal shrinkage rate in transverse direction at 90° C. of reflection film for backlight device (%) | Existence or absence of ultraviolet-absorbing layer | Existence or absence of printed layer for distinguishing | Shape of reflection film for backlight device after evaluation 60.96 cm (24 in.) | Shape of reflection film for backlight device after evaluation 132.08 cm (52 in.) |
|---|---|---|---|---|---|---|---|
| Example 1 | 49.0 | 0.0 | −0.1 | existent | existent | A | B |
| Example 2 | 68.6 | 0.2 | 0.0 | existent | existent | A | B |
| Example 3 | 98.0 | 0.5 | 0.0 | existent | existent | A | B |
| Example 4 | 147.0 | 0.15 | −0.05 | existent | existent | A | A |
| Example 5 | 147.0 | 0.08 | 0.01 | existent | existent | A | A |
| Comparative Example 1 | — | 0.7 | 0.2 | absent | absent | C | C |
| Comparative Example 2 | 29.4 | −0.3 | −0.3 | existent | existent | B | C |
| Comparative Example 3 | 166.6 | 0.6 | 0.2 | existent | existent | B | C |

Subsequently, using blue ink, dots with a diameter of 5 mm arranged 20 mm away from each other in both the longitudinal and the transverse direction were printed with a printer over the other face of the film which was free of the ultraviolet-absorbing layer to provide white film.

Comparative Example 1

188 micrometer thick, porous, biaxially oriented white film of polyethylene terephthalate (Lumiror E60L of Toray Industries Inc.) was used without performing operations for heat treatment or production of the ultraviolet-absorbing layer or printed layer.

Comparative Example 2

White film was produced by the same procedure as in Example 1 except that the tension on the film in the heated oven was 29.4 N/m.

Comparative Example 3

White film was produced by the same procedure as in Example 1 except that the tension on the film in the heated oven was 166.6 N/m.

The white film samples obtained in Examples 1 to 3 and Comparative examples 1 to 3 were evaluated by the evaluation procedure described above. In the case of Examples 1 to 3 and Comparative examples 2 and 3, where dots were printed on the white film samples, the face with these dots was simply attached to the double-sided adhesive tape without careful inspection for distinguishing between the two faces when the white film was adhered to the rear chassis with said double-sided adhesive tape, allowing the adhering operation to be achieved quickly.

Results of the evaluation are shown in Table 1. The white film samples produced in Examples 1 to 3 did not suffer significant changes in shape when its appearance before and after the evaluation was compared. The white film sample produced in Comparative example 1, on the other hand, suffered distortion over the entire face as well as peeling from the adhesive tape in some parts of the end portions. The white film sample produced in Comparative examples 2 and 3 also suffered distortion over the entire face. In addition, the white film sample produced in Comparative example 1 suffered slight surface yellowing caused by ultraviolet ray because it did not have an ultraviolet-absorbing layer.

INDUSTRIAL APPLICABILITY

The white films do not suffer significant distortion or lift in the end portions and, therefore, it can be used as reflection film for large-size backlight devices for liquid crystal displays. The backlight device for liquid crystal displays can serve effectively for a long period of time and, therefore, it can be used in different liquid displays for various electric and electronic apparatuses.

The invention claimed is:

1. A white film consisting essentially of polymer film containing air bubbles and having a thermal shrinkage rate in longitudinal and transverse directions of the film that are not less than −0.2% and not more than 0.5% at 90° C.

2. The white film as described in claim 1, wherein the polymer film is biaxially oriented polyethylene terephthalate film.

3. The white film as described in claim 2, further comprising an ultraviolet-absorbing layer that contains an ultraviolet-absorbing substance on at least one face of the polymer film.

4. The white film as described in claim 3, further comprising a printed layer that contains ink on another face of the white film which is not the face provided with the ultraviolet-absorbing polymer film layer.

5. A backlight device for liquid crystal display comprising white film as described in claim 2.

6. The white film as described in claim 1, further comprising an ultraviolet-absorbing layer that contains an ultraviolet-absorbing substance on at least one face of the polymer film.

7. The white film as described in claim 6, further comprising a printed layer that contains ink on another face of the white film which is not the face provided with the ultraviolet-absorbing polymer film layer.

8. The white film as described in claim 7, wherein the printed layer is provided in parts of polymer film.

9. A backlight device for liquid crystal display comprising white film as described in claim 7.

10. A backlight device for liquid crystal display comprising white film as described in claim 6.

11. A backlight device for liquid crystal display comprising white film as described in claim 1.

12. The backlight device for liquid crystal display as described in claim 11, wherein the backlight device is a direct backlight device.

* * * * *